(12) United States Patent
Motoyama et al.

(10) Patent No.: US 7,103,148 B2
(45) Date of Patent: Sep. 5, 2006

(54) DSL COMMUNICATION METHOD OF PERFORMING AN INTERRUPTION AND A RECONNECTION WHEN AN S/N RATIO IS OUTSIDE OF A PREDETERMINED RANGE FOR A DURATION LONGER THAN A REFERENCE TIME

(75) Inventors: Hideyuki Motoyama, Kawasaki (JP); Naoki Furudate, Kawasaki (JP); Shinichi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 66 days.

(21) Appl. No.: 10/090,946

(22) Filed: Mar. 5, 2002

(65) Prior Publication Data

US 2003/0043971 A1   Mar. 6, 2003

(30) Foreign Application Priority Data

Aug. 29, 2001   (JP)   ............................. 2001-260378

(51) Int. Cl.
*H04M 3/22*   (2006.01)

(52) U.S. Cl. ................................ 379/1.104; 379/27.08; 379/32.01

(58) Field of Classification Search ............... 379/1.01, 379/1.04, 22.02, 22, 22.04, 22.08, 23, 26.01, 379/27.01, 27.03, 27.08, 28, 24, 32.01, 32.04; 370/241, 251, 252, 405, 466, 503; 375/224, 375/225, 227, 222, 229, 230, 231, 232, 233, 375/346, 285, 355, 384
See application file for complete search history.

(56) References Cited

U.S. PATENT DOCUMENTS

| | | | |
|---|---|---|---|
| 6,292,515 B1 * | 9/2001 | Kao et al. | 375/260 |
| 6,356,585 B1 * | 3/2002 | Ko et al. | 375/222 |
| 6,542,581 B1 * | 4/2003 | Suonsivu et al. | 379/1.04 |
| 6,628,754 B1 * | 9/2003 | Murphy et al. | 379/1.03 |

* cited by examiner

*Primary Examiner*—Barry Taylor
(74) *Attorney, Agent, or Firm*—Katten Muchin Rosenman LLP

(57) ABSTRACT

A DSL communication method is used for interconnecting a user and a center by using a 2-wire telephone line and a DSL communications technology so that the user and the center perform an intercommunication. The DSL communication method comprises the step of monitoring a signal-to-noise ratio of an accepted DSL, the step of judging whether or not the signal-to-noise ratio is within a predetermined range, and the step of interrupting the intercommunication once and thereafter reconnecting the user and the center, when the signal-to-noise ratio is judged not to be within the predetermined range for a duration longer than a reference time.

16 Claims, 4 Drawing Sheets

DSL COMMUNICATION METHOD OF PERFORMING AN INTERRUPTION AND A RECONNECTION WHEN AN S/N RATIO IS OUTSIDE OF A PREDETERMINED RANGE FOR A DURATION LONGER THAN A REFERENCE TIME

BACKGROUND OF THE INVENTION

1. Field of the Invention

The present invention generally relates to a DSL communication method and a DSL communication device and, more particularly, to a DSL communication method which interconnects a user and a center by using a 2-wire telephone line and a DSL (Digital Subscriber Lines) communications technology so that the user and the center intercommunicate, and to a DSL communication device adopting the DSL communication method.

2. Description of the Related Art

In an intercommunication according to an xDSL communications technology, such as HDSL (High-bit-rate DSL), SDSL (Symmetric DSL), ADSL (Asymmetric DSL), and VDSL (Very-high-bit-rate DSL) using a 2-wire telephone line, it is difficult to maintain a constant communication quality because a line quality fluctuates due to mutual interferences with a conventionally existing communications technology (telephone, an analog modem communication, an ISDN, etc.) in a frequency band.

Thereupon, for the purpose of adapting to circumstances where a constant communication quality cannot be maintained, the ITU-T recommendations "G.992.1 (G.dmt): Appendix 2" and "G.997.1 (G.ploam)", which are international standards, propose concepts of a method for maintaining an optimal communication quality under constantly changing circumstances by providing a countermeasure named "Dynamic Rate Adaptation" realizable during an online intercommunication against line quality fluctuations.

However, the above-mentioned method requires supports from intercommunicating DSL devices, such as a negotiation between intercommunicating DSL devices, or an exchange of line quality information therebetween. The method functions only when these method supports are in synchronization. Further, the method can be said to be an optional function.

As described above, an intercommunication according to an xDSL communications technology is performed with a constantly fluctuating line quality, which requires an addition of an optional function for maintaining an optimal communication quality under such circumstances. This addition makes DSL devices functionally complicated, and increases apparatus costs. Also, this addition necessitates integrated functions in operating a system including those DSL devices. This raises a problem in interconnecting DSL devices of different vendors at user/center sides.

SUMMARY OF THE INVENTION

It is a general object of the present invention to provide an improved and useful DSL communication method and a DSL communication device in which the above-mentioned problems are eliminated.

A more specific object of the present invention is to provide a DSL communication method which can be adopted in either of intercommunicating devices as an independent function for maintaining an optimal communication quality and communication speed without necessitating an exchange of line quality information between the intercommunicating devices to establish a connection therebetween, and a DSL communication device adopting the DSL communication method.

In order to achieve the above-mentioned objects, there is provided according to one aspect of the present invention a DSL communication method for interconnecting a user and a center by using a 2-wire telephone line and a DSL communications technology so that the user and the center perform an intercommunication, the method comprising the steps of:

monitoring a signal-to-noise ratio of an accepted DSL;

judging whether or not the signal-to-noise ratio is within a predetermined range; and interrupting the intercommunication once and thereafter reconnecting the user and the center, when the signal-to-noise ratio is judged not to be within the predetermined range for a duration longer than a reference time.

The DSL communication method according o the present invention can maintain an optimal communication quality and communication speed, by utilizing a handshake and initialization function performed by a DSL-interface containing unit of a DSL communication device when establishing a connection with another DSL communication device on the other end of the line. Additionally, the DSL communication method does not necessitate an exchange of line quality information with the DSL communication device on the other end of the line when establishing a connection therebetween. Further, the DSL communication method can be adopted in either of the intercommunicating DSL communication devices as an independent function. Therefore, the DSL communication method can be realized at low costs.

Additionally, the DSL communication method according to the present invention further comprises the step of arbitrarily setting an upper limit and a lower limit defining the predetermine range.

According to the present invention, an operator can arbitrarily set the upper limit and the lower limit according to a required communication quality and communication speed.

Additionally, the DSL communication method according to the present invention further comprises the reference time setting step of arbitrarily setting the reference time.

According to the present invention, an operator can arbitrarily set the reference time according to a desired communication quality and communication speed.

Additionally, in the DSL communication method according to the present invention, the reference time setting step sets a first reference time to be compared with a duration during which the signal-to-noise ratio is higher than the upper limit, and sets a second reference time to be compared with a duration during which the signal-to-noise ratio is lower than the lower limit, the first reference time being different from the second reference time.

The DSL communication method according o the present invention can provide a time hysteresis.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 1:
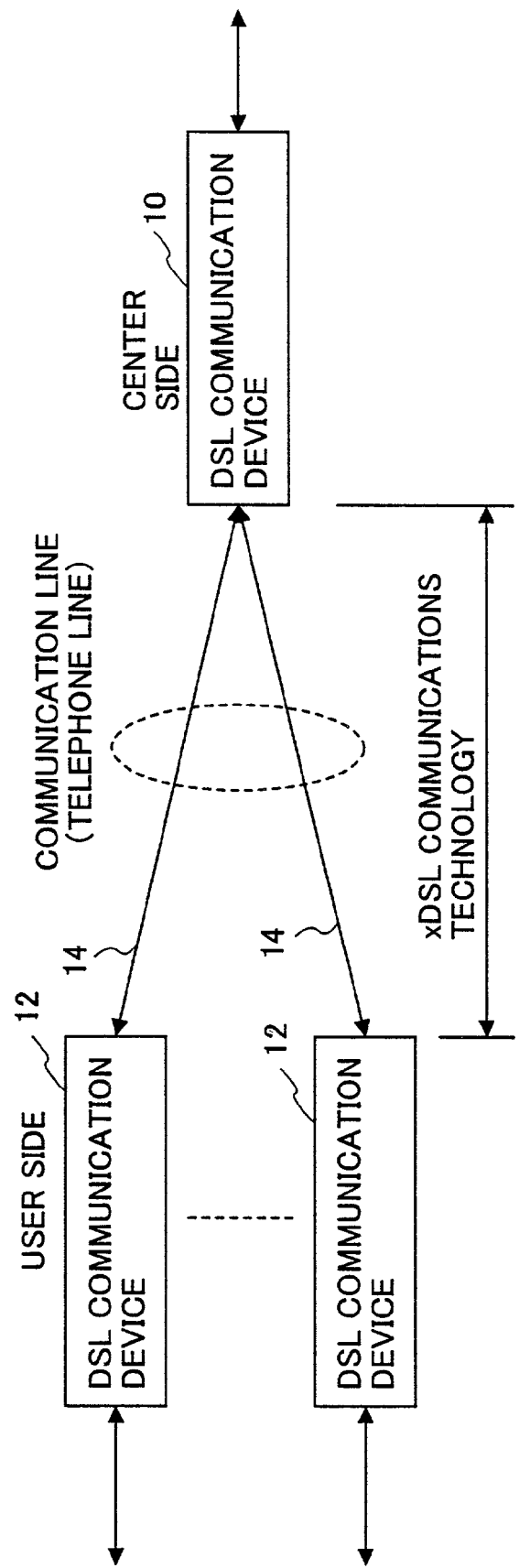
FIG. 1 is a block diagram of an embodiment of a DSL communication system adopting a DSL communication method according to the present invention.

FIG. 1 is a block diagram of an embodiment of a DSL communication system adopting a DSL communication method according to the present invention. In FIG. 1, a DSL communication device 10 at a center side and at least one DSL communication device 12 at a user side are interconnected via a 2-wire telephone line 14 so as to communicate with each other by using an xDSL communications technology.

Figure 2:
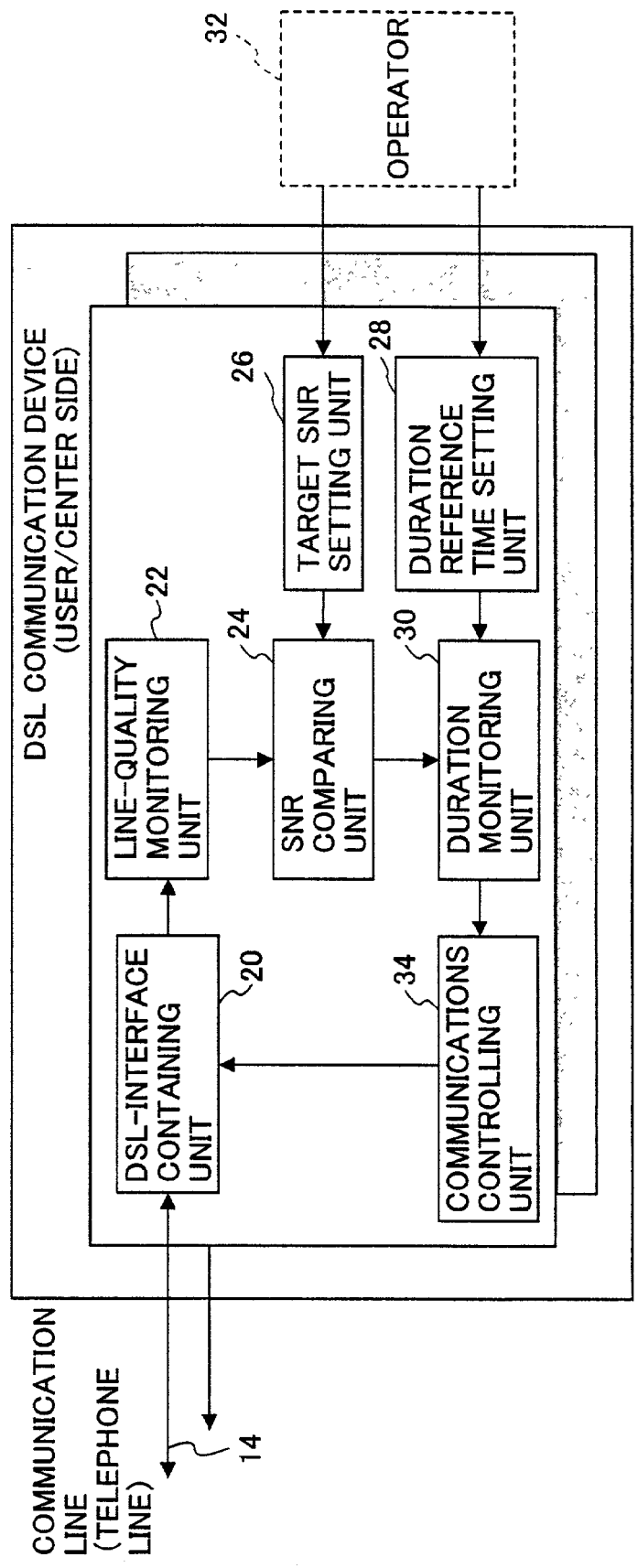
FIG. 2 is a block diagram of an embodiment of a DSL communication device shown in FIG. 1 at a center/user side.

FIG. 2 is a block diagram of an embodiment of the DSL communication device 10/12 at the center/user side. Whereas the DSL communication device 10 at the center side is formed by one circuit shown in FIG. 2, the DSL communication device(s) 12 at the user side may be formed by a plurality of the circuits each shown in FIG. 2. In FIG. 2, a DSL-interface containing unit 20 is connected to the 2-wire telephone line 14 so as to perform an analog transmission with the DSL-interface containing unit 20 (not shown in FIG. 2) on the other end of the 2-wire telephone line 14 by using the xDSL communications technology.

The DSL-interface containing unit 20 contains a DSL communication interface having not only a handshake and initialization function for performing a negotiation over a communication mode and a communication speed, but also a showtime function for performing an intercommunication after the establishment of the negotiation. Upon the start of a communication, the DSL-interface containing unit 20 performs a negotiation over a communication mode and a communication speed so as to maintain a signal-to-noise ratio of an accepted DSL in the proximity of a predetermined criterion value (e.g., 6 dB).

A line-quality monitoring unit 22 monitors the signal-to-noise ratio (SNR: S/N ratio) representing a communication quality of the DSL from which the DSL-interface containing unit 20 is currently receiving data, and supplies the signal-to-noise ratio to an SNR comparing unit (a line-quality judging unit) 24.

A target SNR setting unit (a range setting unit) 26 sets an upper limit and a lower limit of a signal-to-noise ratio to be targeted in an intercommunication, and supplies the upper limit and the lower limit to the SNR comparing unit 24. The upper limit and the lower limit are preset to default values, and can also be set arbitrarily by an operator 32. The upper limit (e.g., 9 dB) is higher than the criterion value (e.g., 6 dB) of the signal-to-noise ratio, and the lower limit (e.g., 3 dB) is lower than the criterion value (e.g., 6 dB).

The SNR comparing unit 24 compares the current signal-to-noise ratio monitored by the line-quality monitoring unit 22 with the upper limit and the lower limit set by the target SNR setting unit 26, and supplies a result of the comparison to a duration monitoring unit 30.

A duration reference time setting unit 28 sets a reference time (e.g., several tens of seconds to several minutes) to which a hereinbelow-described duration is compared, and supplies the reference time to the duration monitoring unit 30. The reference time is preset to a default value, and can also be set arbitrarily by the operator 32.

On the basis of the comparison result supplied from the SNR comparing unit 24, the duration monitoring unit 30 monitors a duration during which the current signal-to-noise ratio is higher than the upper limit, or is lower than the lower limit. When the duration surpasses the reference time, the duration monitoring unit 30 supplies a result of the monitoring to a communications controlling unit 34.

When the monitoring result supplied from the duration monitoring unit 30 indicates that the above-mentioned duration surpasses the reference time, the communications controlling unit 34 performs a control of a communication quality improvement with respect to the DSL-interface containing unit 20. Under this control, the DSL-interface containing unit 20 interrupts the current communication once, and thereafter, the DSL-interface containing unit 20 reconnects to the DSL-interface containing unit 20 on the other end of the 2-wire telephone line 14, and performs a handshake and an initialization so as to establish a negotiation for performing an intercommunication with the DSL-interface containing unit 20 on the other end of the 2-wire telephone line 14.

In the course of the above-mentioned interruption to the reconnection, the DSL-interface containing unit 20 performs a negotiation over a communication mode and a communication speed so as to maintain the signal-to-noise ratio of the accepted DSL in the proximity of the predetermined criterion value (e.g., 6 dB). Accordingly, when the DSL-interface containing unit 20 performs the above-mentioned interruption and the reconnection due to a signal-to-noise ratio lower than the lower limit, the DSL-interface containing unit 20 performs a negotiation by decreasing the communication speed such that the signal-to-noise ratio becomes the criterion value. On the other hand, when the DSL-interface containing unit 20 performs the above-mentioned interruption and the reconnection due to a signal-to-noise ratio higher than the upper limit, the DSL-interface containing unit 20 performs a negotiation by increasing the communication speed such that the signal-to-noise ratio reduces to the criterion value.

Additionally, the target SNR setting unit 26 sets the upper limit and the lower limit so as to obtain a hysteresis characteristic. This enables a stable operation even when the current signal-to-noise ratio frequently fluctuates.

It is noted that the duration monitoring unit 30 and the communications controlling unit 34 form a controlling unit.

Figure 3:
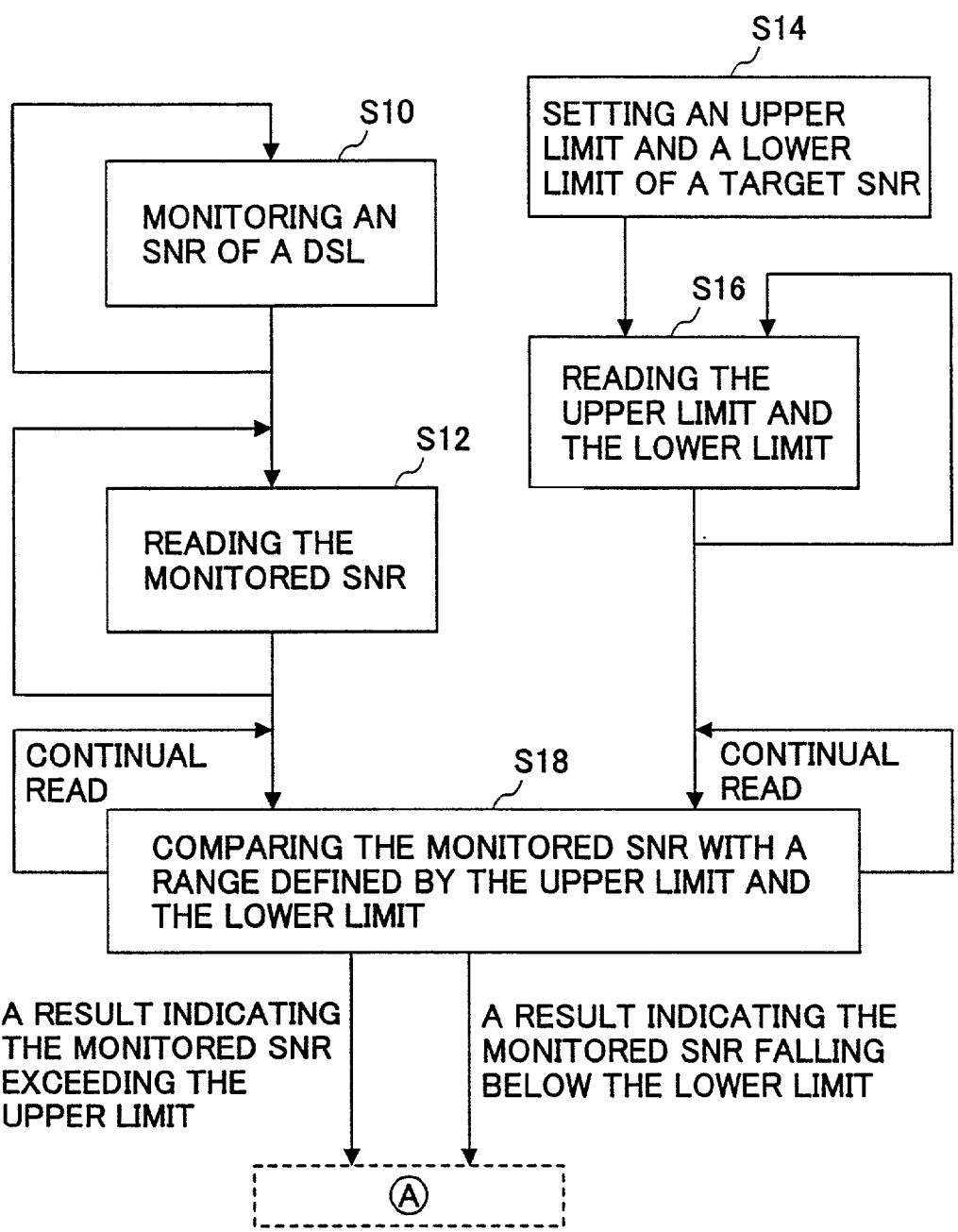
FIG. 3 is a first schematic diagram of operations of a line-quality monitoring function of the DSL communication device according to the present invention.
Figure 4:
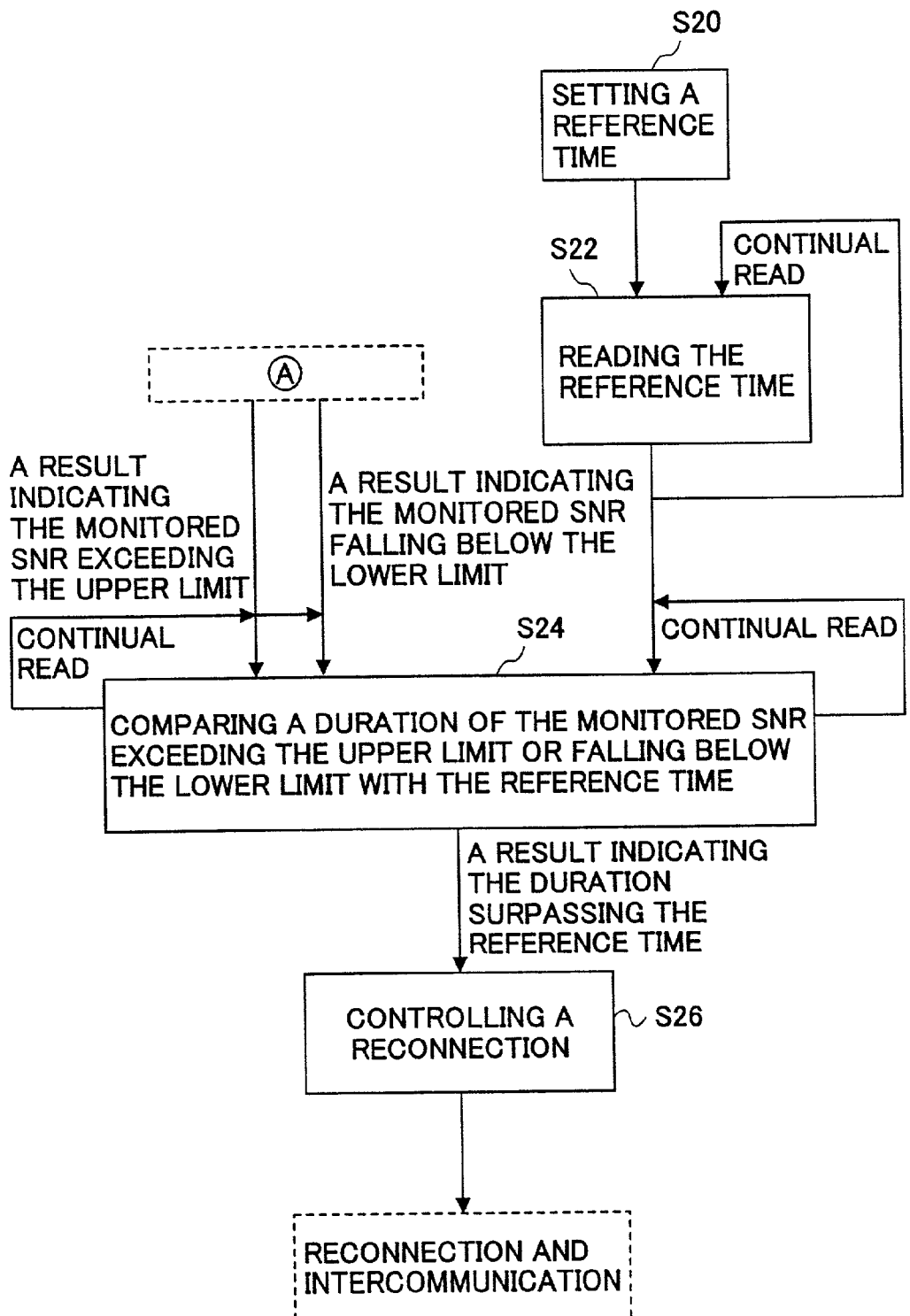
FIG. 4 is a second schematic diagram of the operations of the line-quality monitoring function of the DSL communication device according to the present invention.

FIG. 3 and FIG. 4 are schematic diagrams of operations of a line-quality monitoring function of the DSL communication device according to the present invention. In FIG. 3, in step S10, the line-quality monitoring unit 22 monitors the signal-to-noise ratio (SNR) representing a communication quality of the DSL from which the DSL-interface containing unit 20 is currently receiving data. In step S12, the SNR comparing unit 24 reads the signal-to-noise ratio.

On the other hand, in step S14, the operator 32 sets an upper limit and a lower limit of a signal-to-noise ratio in the target SNR setting unit 26. In step S16, the SNR comparing unit 24 reads the upper limit and the lower limit. In step S18, the SNR comparing unit 24 compares the current signal-to-noise ratio with the set values (the upper limit and the lower limit), and outputs a result of the comparison.

In FIG. 4, the duration monitoring unit 30 continually reads the comparison result output from the SNR comparing unit 24. In step S20, the operator 32 sets a reference time in the duration reference time setting unit 28. In step S22, the duration monitoring unit 30 reads the reference time.

In step S24, the duration monitoring unit 30 monitors a duration during which the current signal-to-noise ratio is outside of a range defined by the upper limit and the lower limit. When the duration surpasses the reference time, the duration monitoring unit 30 supplies a result of the monitoring to the communications controlling unit 34. In step S26, the communications controlling unit 34 receives this monitoring result, and performs a control of a communication speed improvement with respect to the DSL-interface containing unit 20. Under this control, the DSL-interface containing unit 20 interrupts the current communication once, and thereafter, the DSL-interface containing unit 20 reconnects to the DSL-interface containing unit 20 on the other end of the 2-wire telephone line 14, and establishes a negotiation by performing a handshake and an initialization such that the signal-to-noise ratio becomes the criterion value. Then, the DSL-interface containing unit 20 communicates with the DSL-interface containing unit 20 on the other end of the 2-wire telephone line 14.

As described above, the present invention can be realized by utilizing a signal-to-noise ratio monitored at a receiving side by a DSL device adopting an xDSL communications technology, and also by utilizing a negotiation function performed at the start of a communication. Further, all of a line quality monitoring function, a duration monitoring function of fluctuations of a line quality, and a communication control function can be realized by software (firmware) without necessarily entailing hardware, which can be operated solely by a DSL communication device at a center or user side. This overcomes a problem in interconnection between DSL devices-having different functions, and costs involved therewith.

Besides, although the duration of the current signal-to-noise ratio exceeding the upper limit and the duration of the current signal-to-noise ratio falling below the lower limit are compared to the same reference time in the above-described embodiment, the above-mentioned durations may be compared to first and second reference times, respectively, differently set in the duration reference time setting unit 28. This provides a time hysteresis.

The present invention is not limited to the specifically disclosed embodiments, and variations and modifications may be made without departing from the scope of the present invention.

The present application is based on Japanese priority application No. 2001-260378 filed on Aug. 29, 2001, the entire contents of which are hereby incorporated by reference.

What is claimed is:

1. A DSL communication method for interconnecting a user and a center by using a 2-wire telephone line and a DSL communications technology so that said user and said center perform an intercommunication, the method comprising the steps of:

monitoring a signal-to-noise ratio of an accepted DSL;
judging whether or not said signal-to-noise ratio is within a predetermined range; and
causing a DSL interface containing unit to interrupt said intercommunication once and to thereafter reconnect said user and said center, when said signal-to-noise ratio judged not to be within said predetermined range for a duration longer than a reference time, wherein in the reconnecting process said DSL interface containing unit performs a handshake and an initialization so as to establish a negotiation for performing intercommunication with a DSL interface containing unit on the other side of the 2-wire telephone line.

2. The DSL communication method as claimed in claim 1, further comprising the step of arbitrarily setting an upper limit and a lower limit defining said predetermine range.

3. The DSL communication method as claimed in claim 2, further comprising the reference time setting step of arbitrarily setting said reference rime.

4. The DSL communication method as claimed in claim 3, wherein said reference time setting step sets a first reference time to be compared with a duration during which said signal-to-noise ratio is higher than said upper limit, and sets a second reference time to be compared with a duration dining which said signal-to-noise ratio is lower than said lower limit, the first reference rime being identical to the second reference time.

5. The DSL communication method as claimed in claim 3, wherein said reference time setting step sets a first reference time to be compared wit a duration during which said signal-to-noise ratio is higher than said upper limit, and sets a second reference time to be compared with a duration during which said signal-to-noise ratio is lower than said lower limit, the first reference time being different from the second reference time.

6. The DSL communication method as claimed in claim 1, further comprising the reference time setting step of arbitrarily setting said reference time.

7. The DSL communication method as claimed in claim 6, wherein said reference time setting step sets a first reference time to be compared wit a duration during which said signal-to-noise ratio is higher than an upper limit of said predetermined range, and sets a second reference time to he compared with a duration dining which said signal-to-noise ratio is lower than an lower limit of said predetermined range, the first reference time being identical to the second reference time.

8. The DSL communication method as claimed in claim 6, wherein said reference time setting step sets a first reference time to be compared with a duration during which said signal-to-noise ratio is higher than an upper limit of said predetermined range, and sets a second reference time to be compared with a duration during which said signal-to-noise ratio is lower than an lower limit of said predetermined range, the first reference time being different from the second reference time.

9. A DSL communication device comprising:

a DSL-interface containing unit interconnecting a user and a center by using a 2-wire telephone line and a DSL communications technology so as to perform an intercommunication therebetween;
a line-quality monitoring unit monitoring a signal-to-noise ratio of an accepted DSL;
a line-quality judging unit judging whether or not said signal-to-noise ratio is within a predetermined range; and
a controlling unit causing said DSL-interface containing unit to interrupt said intercommunication once and to reconnect said user and said center thereafter, when said signal-to-noise ratio is judged not to be within said predetermined range for a duration longer than a reference time, wherein in the reconnecting process said DSL-interface containing unit performs a handshake and an initialization so as to establish a negotiation for performing intercommunication with a DSL-interface containing unit on the other side of the 2-wire telephone line.

10. The DSL communication device as claimed in claim 9, further comprising.

11. The DSL communication device as claimed in claim 10, further comprising a reference time setting unit arbitrarily setting said reference time.

12. The DSL communication device as claimed in claim 11, wherein said reference time setting unit sets a first reference time to be compared with a duration during which said signal-to-noise ratio is higher than said upper limit, and sets a second reference time to be compared with a duration during which said signal-to-noise ratio is lower than said lower limit, the first reference time being identical to the second reference time.

13. The DSL communication device as claimed in claim 11, wherein said reference time setting unit sets a first reference time to be compared with a duration during which said signal-to-noise ratio is higher than said upper limit, and sets a second reference Time to be compared with a duration during which said signal-to-noise ratio is lower than said lower limit, the first reference time being different from the second reference time a range setting unit arbitrarily setting an upper limit and a lower limit of said predetermine range.

14. The DSL communication device as claimed in claim 9, further comprising a reference time setting unit arbitrarily setting said reference nine.

15. The DSL communication device as claimed in claim 14, wherein said reference time setting unit sets a first reference time to be compared with a duration during which said signal-to-noise ratio is higher than an upper limit of said predetermined range, and sets a second reference time to be compared with a duration during which said signal-to-noise ratio is lower than an lower limit of said predetermined range, the first reference time being identical to the second reference time.

16. The DSL communication device as claimed in claim 14, wherein said reference time setting unit sets a first reference time to be compared with a duration during which said signal-to-noise ratio is higher than an upper limit of said predetermined range, and sets a second reference time to be compared with a duration during which said signal-to-noise ratio is lower than an lower limit of said predetermined range, the first reference time being different from the second reference time.

* * * * *